United States Patent
Onishi et al.

(10) Patent No.: US 9,866,644 B2
(45) Date of Patent: Jan. 9, 2018

(54) TERMINAL, MESSAGE DISTRIBUTION SYSTEM, MESSAGE DISTRIBUTION METHOD, AND COMPUTER-READABLE MEDIUM

(71) Applicant: NEC Corporation, Tokyo (JP)

(72) Inventors: Takeo Onishi, Tokyo (JP); Takahiro Shiroshima, Toyko (JP); Masahiro Kawato, Tokyo (JP); Tadayuki Oono, Tokyo (JP)

(73) Assignee: NEC Corporation, Tokyo (JP)

( * ) Notice: Subject to any disclaimer, the term of this patent is extended or adjusted under 35 U.S.C. 154(b) by 206 days.

(21) Appl. No.: 14/432,725

(22) PCT Filed: Oct. 2, 2013

(86) PCT No.: PCT/JP2013/005876
§ 371 (c)(1),
(2) Date: Mar. 31, 2015

(87) PCT Pub. No.: WO2014/061220
PCT Pub. Date: Apr. 24, 2014

(65) Prior Publication Data
US 2015/0256637 A1    Sep. 10, 2015

(30) Foreign Application Priority Data
Oct. 17, 2012  (JP) .................................. 2012-230001

(51) Int. Cl.
*G06F 15/16* (2006.01)
*H04L 29/08* (2006.01)
(Continued)

(52) U.S. Cl.
CPC .......... *H04L 67/26* (2013.01); *H04L 61/2503* (2013.01); *H04L 67/14* (2013.01);
(Continued)

(58) Field of Classification Search
CPC ... H04L 67/26; H04L 61/2503; H04L 63/029; H04L 67/14; H04L 61/6068; H04M 3/00;
(Continued)

(56) References Cited

U.S. PATENT DOCUMENTS

| 7,617,525 B1 | 11/2009 | Moeck et al. |
| 8,001,590 B1 | 8/2011 | Moeck et al. |

(Continued)

FOREIGN PATENT DOCUMENTS

| CN | 101466092 A | 6/2009 |
| CN | 102388632 A | 3/2012 |

(Continued)

OTHER PUBLICATIONS

Extended European Search Report issued by the European Patent Office for Application No. 13846473.0 dated May 31, 2016 (9 pages).

(Continued)

*Primary Examiner* — Alicia Baturay
*Assistant Examiner* — Joseph Maniwang
(74) *Attorney, Agent, or Firm* — Wilmer Cutler Pickering Hale and Dorr LLP

(57) ABSTRACT

A terminal, a message distribution system, a message distribution method, and a message distribution program are provided, which are capable of reliably delivering a push message to the terminal from a push server, regardless of a type of network utilized by the terminal, while reducing a processing load of the push server.

The terminal includes a network status detection unit 11 which detects a status of a network connecting the terminal and a distribution device performing push-type message distribution, and a reception unit 12 which determines, based on a result of the detection, whether the terminal and the distribution device are located in a same IP address space, (Continued)

selects, if the terminal and the distribution device are not located in the same IP address space, a first communication method utilizing a pre-established TCP session, selects, if the terminal and the distribution device are located in the same IP address space, a second communication method utilizing a TCP session between the distribution device and the terminal, which is newly established by the distribution device when a message is distributed, and receives a message from the distribution device.

12 Claims, 12 Drawing Sheets

(51) Int. Cl.
  *H04L 29/06* (2006.01)
  *H04L 29/12* (2006.01)
  *H04W 28/02* (2009.01)
  *H04W 48/18* (2009.01)
  *H04W 84/12* (2009.01)

(52) U.S. Cl.
  CPC ....... *H04L 69/163* (2013.01); *H04W 28/0215* (2013.01); *H04L 61/6068* (2013.01); *H04W 48/18* (2013.01); *H04W 84/12* (2013.01)

(58) Field of Classification Search
  CPC .. H04W 23/0215; H04W 48/18; H04W 84/12
  USPC ....................................................... 709/227
  See application file for complete search history.

(56) References Cited

U.S. PATENT DOCUMENTS

| 2003/0165121 | A1 | 9/2003 | Leung et al. | |
| 2008/0075097 | A1 | 3/2008 | Kitada | |
| 2012/0195218 | A1* | 8/2012 | Lee | H04L 12/1859 370/252 |
| 2013/0086207 | A1* | 4/2013 | Lee | H04L 67/26 709/217 |
| 2013/0212203 | A1* | 8/2013 | Park | H04L 12/5895 709/206 |

FOREIGN PATENT DOCUMENTS

| CN | 102420827 A | 4/2012 |
| JP | 2003-032750 A | 1/2003 |
| JP | 2005-519568 A | 6/2005 |
| JP | 2008-085470 A | 4/2008 |
| JP | 2011-123801 A | 6/2011 |
| JP | 2012-109641 A | 6/2012 |
| WO | WO-03/077503 A1 | 9/2003 |
| WO | WO-2006/077283 A1 | 7/2006 |

OTHER PUBLICATIONS

International Search Report corresponding to PCT/JP2013/005876 dated Jan. 14, 2014 (one page).

Chinese Notification of First Office Action issued in corresponding Chinese Patent Application No. 201380054088.9, dated Jan. 3, 2017, 37 pages.

Japanese Notification of Reasons for Refusal issued in Japanese Patent Application No. 2014-541923, dated Jul. 18, 2017, 5 pages. Hiroyuki and Mr. Fujitsu BSC's MDM solution Fence-Mobile Remote Manager were evaluated with restriction of Curl Global Community, Jun. 19, 2012, 6 pages. downloaded from URL: http://communities.curl.com./showthread.php?tid=537.

* cited by examiner

TERMINAL, MESSAGE DISTRIBUTION SYSTEM, MESSAGE DISTRIBUTION METHOD, AND COMPUTER-READABLE MEDIUM

CROSS-REFERENCE TO RELATED APPLICATIONS

This application is a national stage application of International Application No. PCT/JP2013/005876 entitled "Terminal, Message Distribution System, Message Distribution Method, and Message Reception Program," filed on Oct. 2, 2013, which claims the benefit of the priority of Japanese Patent Application No. 2012-230001, filed on Oct. 17, 2012, the disclosures of each of which are hereby incorporated by reference in their entirety.

TECHNICAL FIELD

The present invention relates to a terminal, a message distribution system, a message distribution method, and a message distribution program for providing an event notification service to a user.

BACKGROUND ART

There is an event notification service in which a notification of an event (e.g., a VoIP (Voice over Internet Protocol) incoming call notification, and an SNS (Social Networking Service) update notification) is actively sent from a server device to a terminal through an IP (Internet Protocol) network. A push-type notification which a server device sends in the event notification service is called a "Push Notification" or a push message. The server device (hereinafter referred to as a push server) sending a push message receives, from a service provider server (hereinafter referred to as an application server), a notification request relating to a VoIP incoming notification, an SNS update notification, chat message distribution, a cloud storage update notification, and the like. The application server is a server device used by a service provider such as an SNS administrator.

The service provider uses the application server to request the push server for message distribution to an application provided by the service provider. The service provider preliminarily provides, to a user, an application for utilizing the service. Then, the user causes the application provided by the service provider to run on the terminal.

The push server transmits a push message to software (hereinafter referred to as a push client) running on the terminal according to the message distribution request. The push client passes the received message to the application specified by the destination-address of the received message. The application performs processing according to contents of the message received from the push client.

In the event notification service, the push server issues an ID for each combination of the terminal and the application. For example, the push server issues an ID "xxxA" for an application A in a terminal X, an ID "xxxB" for an application B in the terminal X, and an ID "yyyC" for an application C in a terminal Y. The push server, the push client, and the application server share each ID.

FIG. 11 is an explanatory diagram illustrating an outline of the event notification service. When making a message distribution request, the application server passes to the push server an ID indicating a combination of the terminal indicated by the destination-address of the message distribution and the application, together with the message distribution request. FIG. 11 illustrates an example of a case where an application server 700-1 of a service provider A passes the ID "xxxA" to a push server 600 together with a message distribution request addressed to the application A in the terminal X. Here, it is assumed that terminals 500-1 and 500-2 correspond to the terminals X and Y, respectively. Further, it is assumed that an application (hereinafter described as the application A) provided by the service provider A to the terminal X, and an application (hereinafter described as the application B) provided by the service provider B to the terminal X are stored in the terminal X. Moreover, it is assumed that an application (hereinafter described as the application C) provided by the service provider C to the terminal Y is stored in the terminal Y.

The push server 600 transmits, based on the ID "xxxA", a message to the terminal X which is the destination-address of the message distribution. The push client 510-1 in the terminal X transmits, based on the ID "xxxA", the received message to the application indicated by the destination-address of the message distribution, that is, the application A.

The application A performs processing according to the received message. For example, the application A notifies a user of information. The application A communicates with a content server and acquires updated contents from the content server.

PTL 1 describes a method of selecting, depending on a network environment and a push-server's resource state, a connection-type distribution method which continues to maintain connection to the push server from the terminal, or a polling-type distribution method in which the terminal periodically performs polling to the push server (see, e.g., PTL 1).

CITATION LIST

Patent Literature

[PTL 1] Japanese Patent Application Laid-Open No. 2011-123801

SUMMARY OF INVENTION

Technical Problem

The terminal utilizes various networks such as a 3G (3rd Generation) network and a WiFi (Wireless Fidelity) (registered trademark). Depending upon the network utilized by the terminal, a method of connecting between the push server and the terminal may be restricted by a NAT (Network Address Translation) or a FW (Fire Wall). In such a situation, it may be unable to reliably deliver a push message to the terminal.

Such a case is, for example, a case where the terminal is subordinated to a NAT-device to which the push server is not subordinated, that is, a router or the like having a NAT function is installed between the push server and the terminal. In this case, the IP address space used by the push server differs from that used by the terminal. Thus, an IP packet cannot be transmitted directly to the terminal from the push server. Accordingly, a TCP session is pre-established from the terminal to the push server. The push server transmits a push message to the terminal, utilizing the established TCP session.

The router having the NAT function converts between the global address and the private address of the terminal, using an IP conversion table. The IP conversion table stores information representing a correspondence between the global address and the private address in each TCP session. According to the NAT, a TCP session in which no communication is performed in a predetermined time is determined to be timed out. This TCP session is deleted from the IP conversion table. The TCP session deleted from the IP conversion table is set so that communication cannot be performed. Then, the push server cannot deliver a push message to the terminal.

Therefore, in an environment in which the terminal is subordinated to the NAT-device to which the push server is not subordinated, even if there is no push message to distribute, in order to maintain a TCP session, communication is periodically performed between the push server and the terminal. For example, KeepAlive signals are periodically transmitted and received.

When utilizing a mobile network such as the 3G network or a LTE (Long Term Evolution) network, the terminal switches a radio state according to a communication state in order to save electric-power. For example, the terminal changes the radio state into a standby state or an active state according to the communication state. When switching the radio state, the terminal transmits or receives to or from the mobile network a control signal for switching radio state. In a case where an application or the like running on the terminal periodically generates communication, the radio state of the terminal alternately repeats the standby state and the active state. Thus, many control signals flow on the mobile network, and congestion occurs in the network. Further, the generation of many control signals increases a processing load for responding to a control signal in the push server. Thus, the periodic communication for maintaining a TCP session causes congestion in the mobile network and increases the processing load of the push server.

If the push server and the terminal are located inside the same NAT-device, that is, if the push server and the terminal are in the same IP address space, an IP packet can be sent directly to the terminal from the push server. Thus, if the push server and the terminal are located inside the same NAT-device, it is unnecessary to always maintain a TCP session. Therefore, the congestion in the mobile network can be suppressed. However, the device such as a smartphone can easily change the network which the device utilizes. Accordingly, it is difficult to always locate the push server and the device inside the same NAT. For example, even when the terminal and the push server are located inside the same NAT-device, if the device changes the network to a WiFi, the device may be subordinated to the NAT-device of the WiFi.

The method described in PTL 1 selects a distribution method according to the situation of the network in use, e.g., a communication speed or a connection durable time. In other words, the method described in PTL 1 does not select a distribution method according to the type of network. Therefore, when using the method described in PTL 1, a connection-type distribution method may be selected in the mobile network. Thus, congestion may be caused in the mobile network.

Accordingly, the present invention aims at providing a terminal, a message distribution system, a message distribution method, and a message distribution program, which are capable of reliably delivering a push message to a terminal from a push server, regardless of the type of network, while reducing the processing load of the push server.

Solution to Problem

A terminal according to the present invention is characterized by including a network status detection unit which detects a status of a network connecting the terminal and a distribution device that performs push-type message distribution, and a reception unit which determines, based on a result of the detection, whether the terminal and the distribution device are located in a same IP address space, selects, if the terminal and the distribution device are not located in the same IP address space, a first communication method utilizing a pre-established TCP session, selects, if the terminal and the distribution device are located in the same IP address space, a second communication method utilizing a TCP session between the terminal and the distribution device newly established by the distribution device when a message is distributed, and receives a message from the distribution device according to the selected communication method.

A message distribution system according to the present invention is characterized by including a terminal, and a distribution device which performs push-type message distribution to the terminal, the terminal including a network status detection unit which detects a status of a network connecting the terminal and a distribution device that performs push-type message distribution, and a reception unit which determines, based on a detection result, whether the terminal and the distribution device are located in a same IP address space, selects, if the terminal and the distribution device are not located in the same IP address space, a first communication method utilizing a pre-established TCP session, selects, if the terminal and the distribution device are located in the same IP address space, a second communication method utilizing a TCP session between the terminal and the distribution device newly established by the distribution device when a message is distributed, and receives a message from the distribution device according to the selected communication method, wherein the distribution device includes a control unit which performs message distribution according to a communication-method selection result notified from the terminal.

A message distribution method according to the present invention is characterized by including detecting by a terminal a status of a network connecting the terminal and a distribution device which performs message distribution, determining, based on a detection result, whether the terminal and the distribution device are located in a same IP address space, selecting, if the terminal and the distribution device are not located in the same IP address space, a first communication method utilizing a pre-established TCP session, selecting, if the terminal and the distribution device are located in the same IP address space, a second communication method utilizing a TCP session between the terminal and the distribution device newly established by the distribution device when a message is distributed, and performing message distribution by the distribution device according to a communication-method selection result notified from the terminal.

A message reception program according to the present invention is characterized by causing a computer mounted in a terminal capable of communicating with a distribution device that performs push-type message distribution, to execute processing of detecting a status of a network connecting between the terminal and the distribution device, processing of determining, based on a result of the detection, whether the terminal and the distribution device are located in a same IP address space, selecting, if the terminal and the distribution device are not located in the same IP address space, a first communication method utilizing a pre-established TCP session, and selecting, if the terminal and the distribution device are located in the same IP address space, a second communication method utilizing a TCP session between the terminal and the distribution device newly established by the distribution device when a message is distributed, and processing of receiving a message from the message distribution according to the selected communication method.

Advantageous Effects of Invention

According to the present invention, while reducing the processing load of a push server, a push message can reliably be delivered to a terminal from the push server, regardless of the type of network.

DESCRIPTION OF EMBODIMENTS (First Exemplary Embodiment)

Hereinafter, a first exemplary embodiment of the present invention is described with reference to the drawings.

Figure 1:
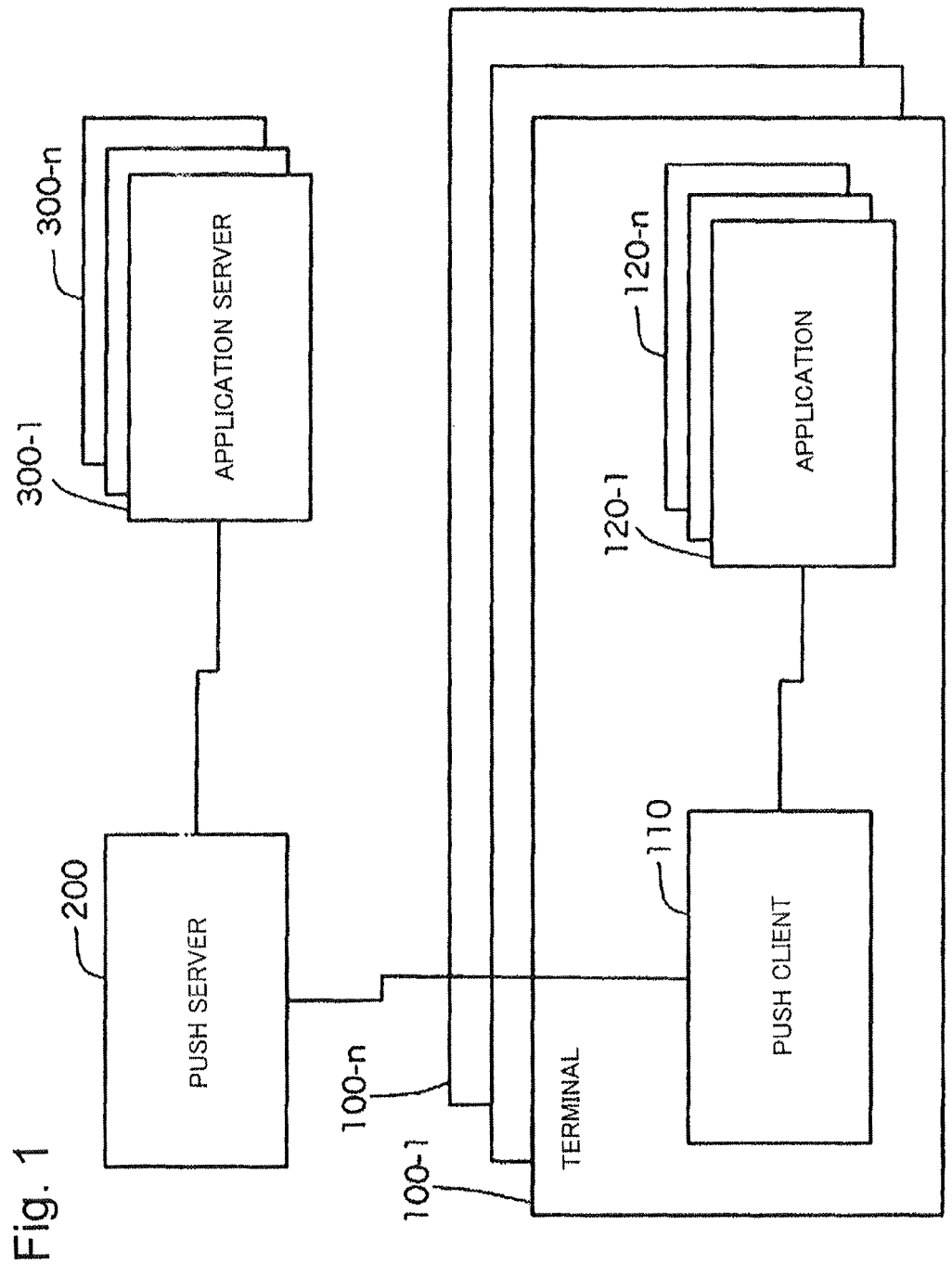
FIG. 1 is a block diagram illustrating a configuration of a first exemplary embodiment of a message distribution system according to the present invention.

FIG. 1 is a block diagram illustrating a configuration of a first exemplary embodiment of a message distribution system according to the present invention.

As illustrated in FIG. 1, a communication system includes terminals 100-1 to 100-n, a push server 200, and application servers 300-1 to 300-n. Incidentally, although a single push server 200 is exemplified in FIG. 1, any number of push servers may be included.

The terminals 100-1 to 100-n are, for example, communication terminals such as mobile phones. The push server 200 is communicatably connected to the application servers 300-1 to 300-n. The push server 200 is communicatably connected to the terminals 100-1 to 100-n via a mobile network, or a wireless LAN, and the Internet. The mobile network is, for example, a 3G network or an LTE network. The wireless LAN is, for example, a WiFi.

Each terminal includes a push client 110 and applications 120-1 to 120-n.

Figure 2:
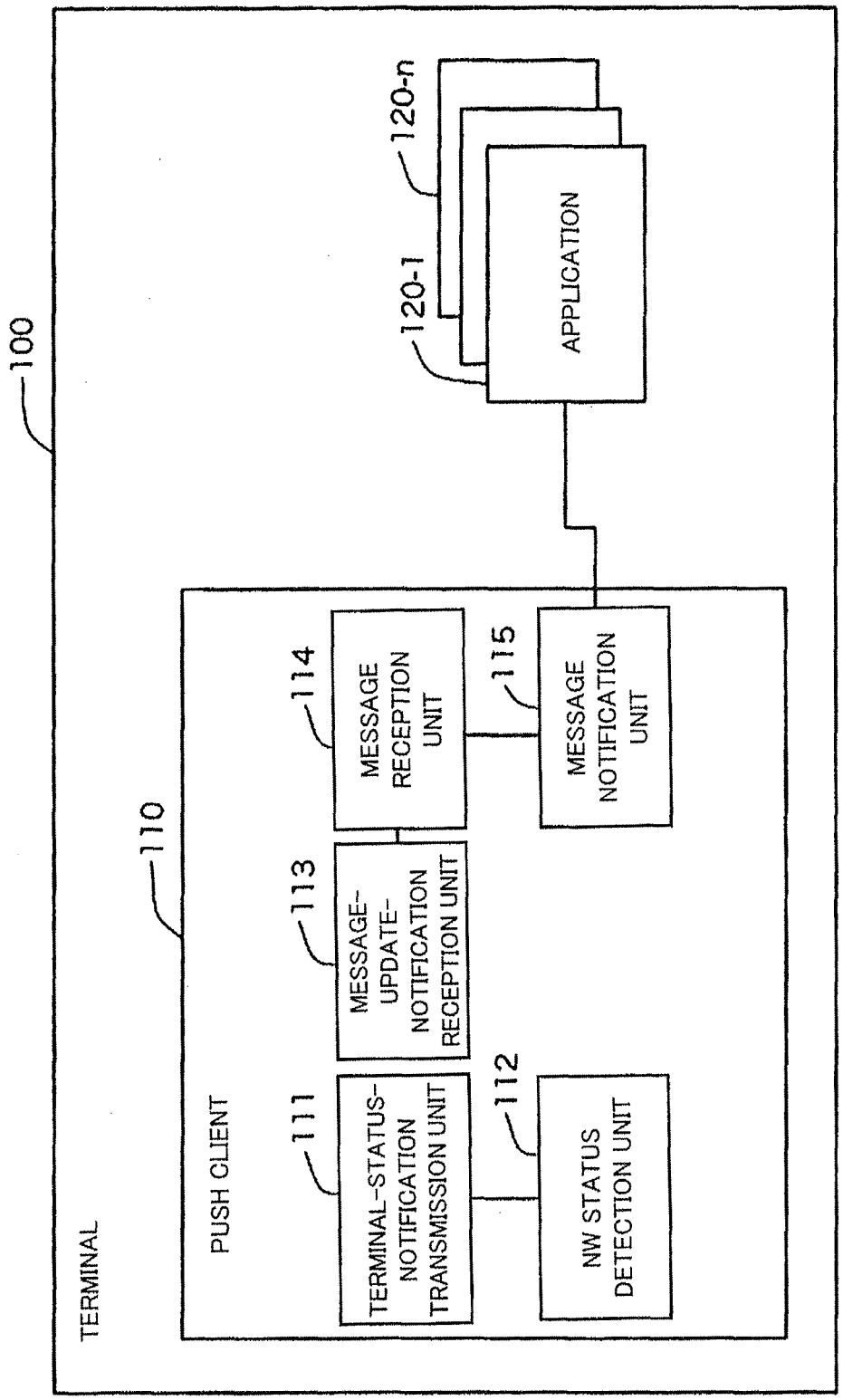
FIG. 2 is a block diagram illustrating a configuration of a first exemplary embodiment of a terminal.

FIG. 2 is a block diagram illustrating a configuration of the first exemplary embodiment of the terminal.

As illustrated in FIG. 2, the push client 110 of each terminal 100 (each of terminals 100-1 to 100-n) includes a terminal-status-notification transmission unit 111, a network (NW) status detection unit 112, a message-update-notification reception unit 113, a message reception unit 114, and a message notification unit 115.

The terminal-status-notification transmission unit 111 performs terminal status notification. Specifically, the terminal-status-notification transmission unit 111 notifies the push server 200 of information (hereinafter described as terminal status information) representing a terminal status. The terminal status information includes, for example, the IP address of the terminal 100.

The NW status detection unit 112 detects a network status. Specifically, the NW status detection unit 112 detects, as a network status, a type of network to which the terminal 100 and the push server 200 are connected. The type of network is, for example, a wireless LAN, and a mobile network.

The message-update-notification reception unit 113 receives a message update notification transmitted from the push server 200.

The message reception unit 114 receives, from the push server 200, messages relating to a message update notification.

The message notification unit 115 passes, to the applications 120-1 to 120-n, a message received from the push server 200.

The applications 120-1 to 120-n are application programs running on the terminal 100. The applications 120-1 to 120-n are provided from, for example, a service provider or the like, and stored in a storage unit (not illustrated) provided in the terminal.

Incidentally, the push client 110 is implemented by a CPU or the like provided in the terminal 100.

The push server 200 is a server device which distributes a push message to the terminals. The push server 200 includes a control unit (not illustrated). Incidentally, the control unit is implemented by a CPU or the like provided in the push server 200. Hereinafter, the expression "the control unit of the push server 200 processes" is described simply as "the push server 200 processes".

The application servers 300-1 to 300-n are server devices used by each service provider. Each of the application servers 300-1 to 300-n transmits, in response to an operation input by, e.g., a service provider, a message distribution request to the push server 200.

Next, an operation of the present exemplary embodiment is described.

First, an operation of determining a method (hereinafter referred to as a push method) how the terminal 100 acquires a push message is described.

In the present exemplary embodiment, the terminal uses a first communication method and a second communication method as a push method. The first communication method is a long polling method (hereinafter referred to simply as a long polling). The second communication method is a direct IP method (hereinafter referred to simply as a direct IP).

The long polling is a method in which the push server blocks a response to an HTTP request (HTTP GET) from the terminal until a push message to distribute is generated. In other words, if there are no messages to distribute, the push server makes no response to the HTTP response until the push server receives a message distribution request from the application server.

The long polling utilizes an HTTP. Thus, even when the terminal is connected to a wireless LAN, such as a WiFi, so that the terminal is subordinated to the NAT-device of the wireless LAN, a push message can be delivered to the terminal. Further, even in an environment, like an intra-corporate intranet, in which a terminal is connected to the Internet through a proxy server, the long polling can deliver a push message to the terminal.

However, the long polling needs to always maintain a TCP session. Thus, the push server and the terminal need to periodically perform communication in order to maintain a TCP session. Therefore, when long polling is performed in a mobile network, congestion may occur. In addition, a server load may increase.

The direct IP is a method in which the push server establishes, when distributing a message, a TCP session with the terminal and transmits a push message, utilizing the established TCP session.

If the terminal is subordinated to the NAT-device of the wireless LAN, the terminal and the push server are located in different IP address spaces, respectively, so that the push server cannot establish a TCP connection to the terminal. Therefore, when the direct IP is utilized, it is necessary to locate the push server and the terminal inside the same NAT-device.

A telecommunication firm (carrier) can install a push server in a mobile network. In other words, the push server and the terminal can be installed inside the same NAT-device. Thus, even in an environment in which the mobile network is connected to the Internet via the NAT-device, the direct IP can be utilized via the mobile network by installing the push server in the mobile network by the carrier.

Even when the push server and the terminal are not located inside the same NAT-device, if a global IP address is assigned to the terminal, the push server can establish a TCP session with the terminal. Therefore, the direct IP can be utilized.

The direct IP does not need to always maintain a TCP session. Therefore, even when the direct IP is utilized in the mobile network, the direct IP does not cause congestion.

Thus, in the present exemplary embodiment, the terminal 100 properly uses the push methods according to the status of network. Specifically, in a case where the network is a wireless LAN, such as a WiFi, so that generally, the terminal is subordinated to the NAT-device thereof, the terminal 100 selects the long polling. In a case where the network is a mobile network including the terminal and the push server located inside the same NAT-device, the terminal 100 selects the direct IP.

Figure 3:
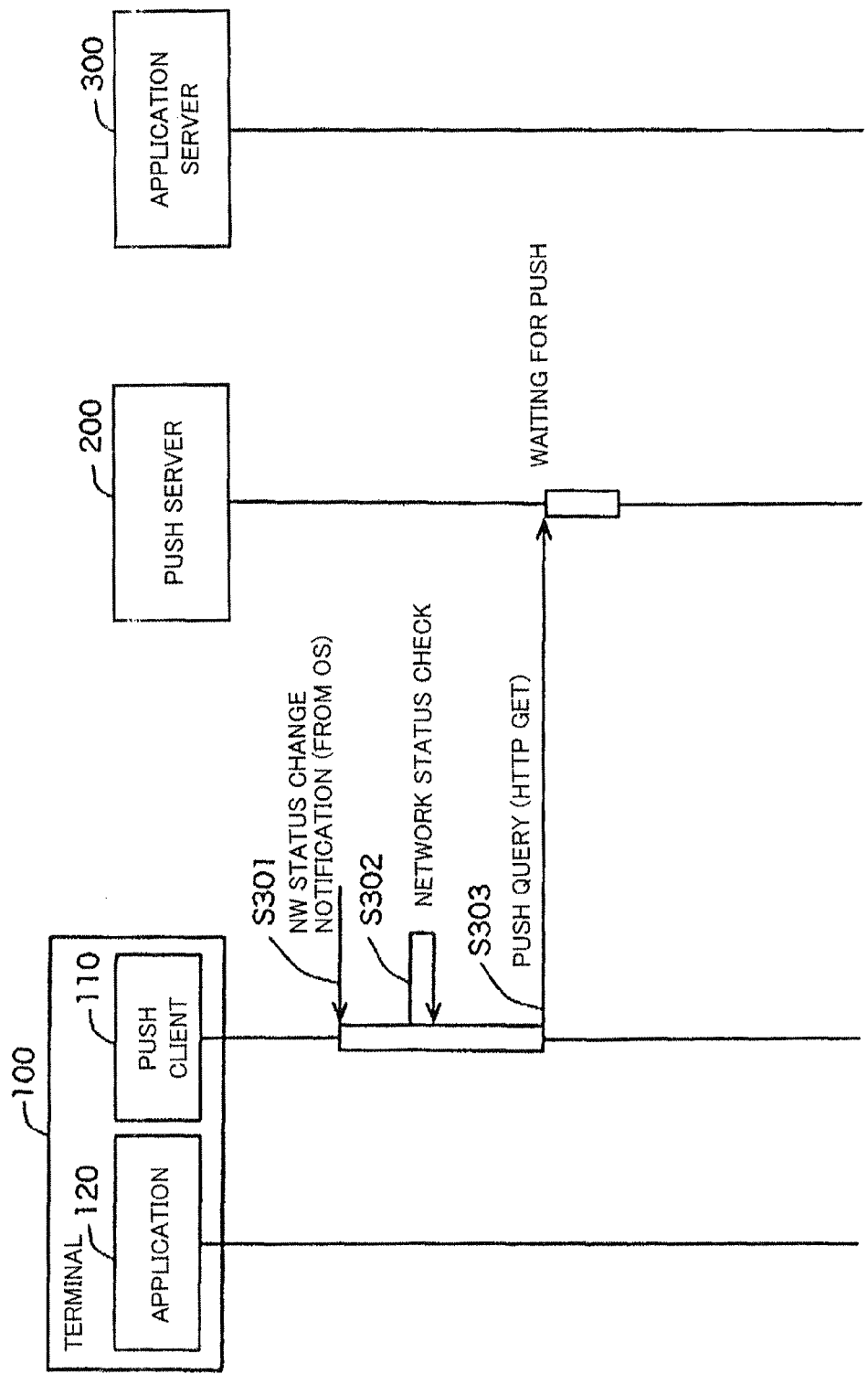
FIG. 3 is a sequence diagram illustrating an operation when the terminal selects a long polling method as a push method.

FIG. 3 is a sequence diagram illustrating an operation when a terminal 100 selects the long polling as the push method. Incidentally, in FIG. 3, a single application 120 (i.e., each of the applications 120-1 to 120-n) is exemplified. However, any number of applications may run on the terminal 100. In addition, in FIG. 3, the single terminal 100 is exemplified. However, in the case of connecting a plurality of terminals to the push server 200, each terminal operates similarly to the terminal 100.

If the status of the network connecting the terminal 100 and the push server 200 changes, the push client 110 of the terminal 100 detects that the status of the network changes (step S301). Specifically, the NW status detection unit 112 of the push client 110 receives, from an OS (Operating System) operating in the terminal 100, a notification (hereinafter described as a NW status change notification) indicating that the status of the network changes.

The NW status detection unit 112 checks the status of the network, based on the NW status change notification (step S302). Specifically, the NW status detection unit 112 checks the type of the network connecting the terminal 100 and the push server 200. Here, the NW status detection unit 112 recognizes that the terminal 100 and the push server 200 are connected via the wireless LAN to each other.

Because the network is a wireless LAN, the message reception unit 114 selects the long polling as the push method. Then, the message reception unit 114 transmits a query request to the push server 200 in order to make a query (hereinafter described as a push query) about presence/absence of a push message to distribute. Specifically, the message reception unit 114 transmits an HTTP request (step S303).

The push server 200 does not instantly respond to the HTTP request. The push server 200 blocks a response to the HTTP request until a push message to distribute to the push client 110 of the terminal 100 is generated. Incidentally, if there is a push message to distribute, the push server 200 instantly returns a response without blocking.

Figure 4:
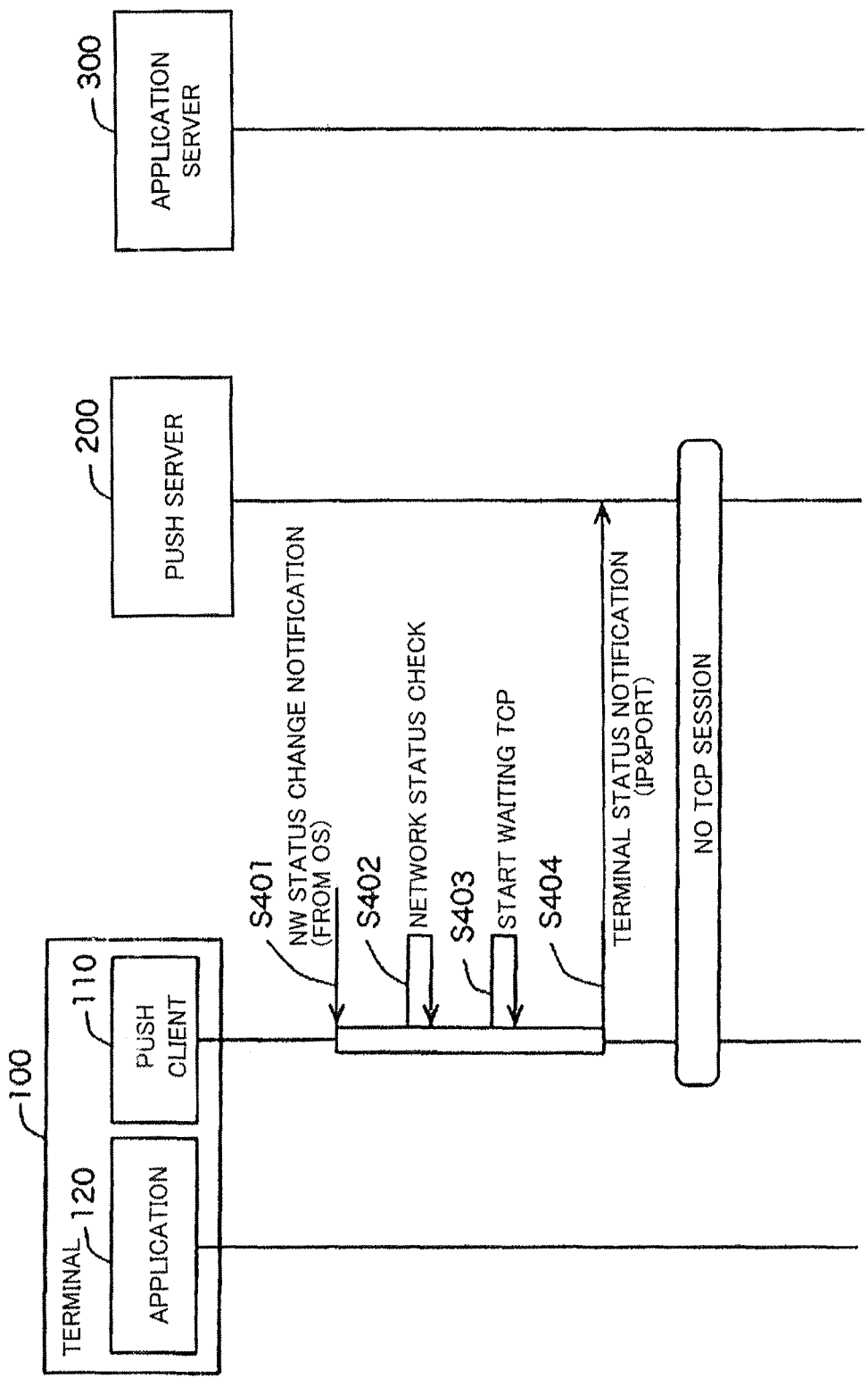
FIG. 4 is a sequence diagram illustrating an operation when the terminal selects a direct IP method as a push method.

FIG. 4 is a sequence diagram illustrating an operation when the terminal 100 selects the direct IP method as the push method.

Processing in step S401 and that in step S402 are similar to that in the step S301 and that in the step S302, respectively. Therefore, a description of the processing in the step S401 and the processing in the step S402 is omitted.

Incidentally, in the step S402, the NW status detection unit 112 recognizes that the terminal 100 and the push server 200 are connected via a mobile network to each other.

Because the network is a mobile network, the message reception unit 114 selects the direct IP as the push method.

The message-update-notification reception unit 113 starts listening a TCP (step S403). Specifically, the message-update-notification reception unit 113 opens a TCP port so as to make the TCP port ready to receive a message update notification.

The terminal-status-notification transmission unit 111 notifies the status of the terminal (step S404). Specifically, the terminal-status-notification transmission unit 111 transmits, to the push server 200, terminal status information including the IP address of the terminal and the port No. of the TCP port opened by the message-update-notification reception unit 113.

After the step S404, the push client 110 of the terminal 100 waits for a TCP connection from the push server 200. In other words, the push client 110 waits for the push server 200 to establish a TCP session with the terminal 100. At that time, a TCP session between the push client 110 and the push server 200 is not established. Therefore, the push client 110 and the push server 200 do not need to periodically communicate with each other in order to maintain a TCP session.

Hereinafter, a process of determining a push method in the push server 200 is described.

When receiving an HTTP request for a push query in the step S303, the push server 200 determines that the terminal 100 selects the long polling. Further, when receiving, terminal status information from the terminal-status-notification transmission unit 111 in the step S404, the push server 200 determines that the terminal 100 selects the direct IP.

Thus, a result of selecting the push method is notified to the push server 200 by the terminal status notification or the push query. In order to implement such an embodiment, it is useful, for example, that a path of a URL of the terminal status notification, and a path of the push query are set separately, and that then, the push server 200 determines which of the URLs is accessed.

Next, an operation of acquiring a push message by the terminal 100 using the long polling is described.

Figure 5:
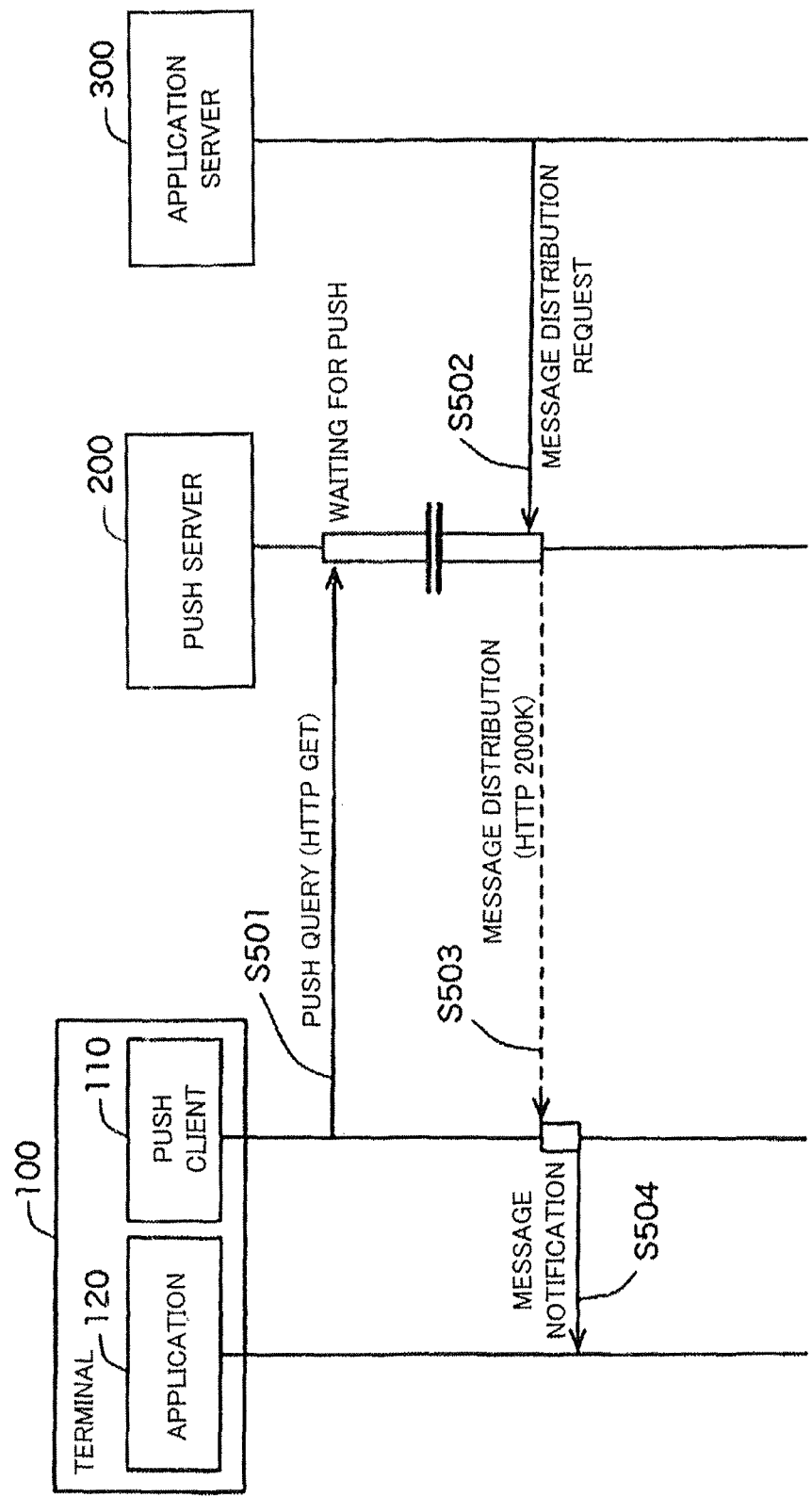
FIG. 5 is a sequence diagram illustrating a push-message distribution process according to the long polling method.

FIG. 5 is a sequence diagram illustrating a push-message distribution process according to the long polling method.

The sequence diagram shown in FIG. 5 illustrates an operation of the message distribution system after the push query is made by the terminal 100.

When receiving a push query as an HTTP request from the message reception unit 114 of the push client 110 (step S501), the push server 200 determines that the terminal 100 selects the long polling. At that time, the push server 200 waits for the generation of a push message to distribute, without responding instantly. In other words, the push server 200 is in a state of waiting for a push.

When receiving a push-message distribution request from the application server 300 (step S502), the push server 200 transmits to the push client 110 a push message together with an HTTP response (HTTP 200OK) indicating that the HTTP request is normally processed (step S503).

The message notification unit 115 of the push client 110 passes the message received in the step S503 to a related application (step S504).

Next, an operation of acquiring a push message by the terminal 100 according to the direct IP is described.

Figure 6:
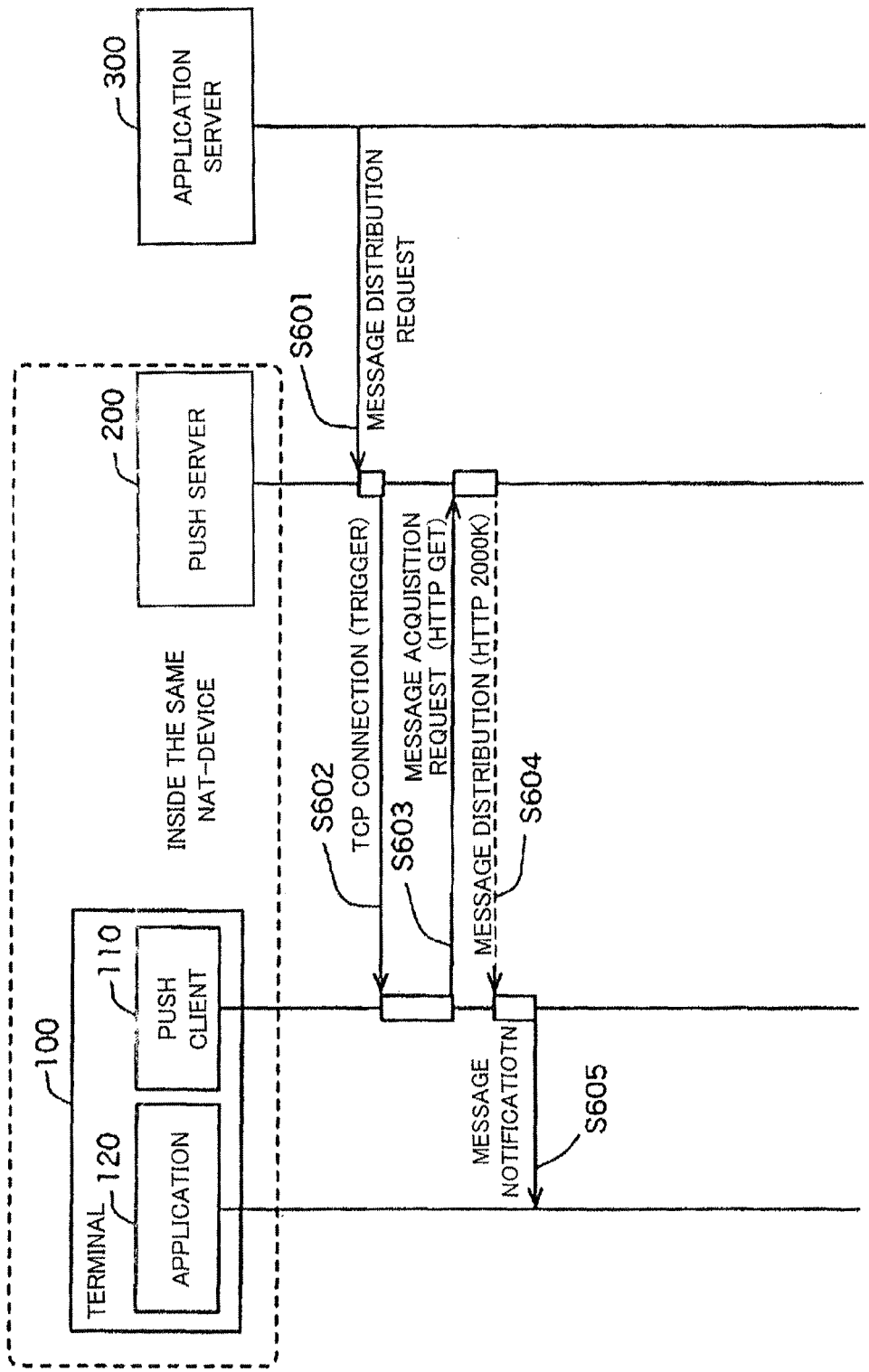
FIG. 6 is a sequence diagram illustrating a push-message distribution process according to the direct IP method.

FIG. 6 is a sequence diagram illustrating a push-message distribution process according to the direct IP method.

The sequence diagram shown in FIG. 6 illustrates an operation of the message distribution system after the terminal 100 transmits the terminal status notification.

When receiving a terminal status notification from the terminal 100, that is, when receiving terminal status information from the terminal 100, the push server 200 determines that the terminal 100 selects the direct IP. Then, when receiving a push-message distribution request from the application server 300 (step S601), the push server 200 performs a TCP connection to the client 110 (step S602). In the direct IP, this TCP connection is represented by a message update notification. In other words, the message-update-notification reception unit 113 detects the TCP connection. Thus, the message-update-notification reception unit 113 determines that a message update notification is performed.

When the message-update-notification reception unit 113 detects the TCP connection to the push server 200, the message reception unit 114 uses this detection as a trigger and starts a message acquisition process. In other words, the message reception unit 114 transmits a message acquisition request as an HTTP request (step S603).

The push server 200 transmits, to the push client 110, a push message together with an HTTP response indicating that the HTTP request is normally processed (step S604).

The message notification unit 115 of the push client 110 passes, to a related application, the message received in the step S604 (step S605).

As described above, in the present exemplary embodiment, the terminal determines the push method according to the status of the network. Thus, as compared with the case of utilizing only the long polling method, the processing load of the push server can be reduced, and, in addition, a push message can reliably be delivered to a push client in the terminal, regardless of the type of the network utilized by the terminal.

Further, because the direct IP which does not need to always maintain a TCP session is selected when the terminal utilizes a mobile network, congestion of control signals in a mobile network can be suppressed from occurring.

Incidentally, in the present exemplary embodiment, when the terminal and the push server exist in different IP address spaces, respectively, the long polling which allows to perform communication via a NAT-device/FW or communication via a proxy server is selected as the push method. However, other methods can be utilized as the push method. For example, if it is allowed that communication via a proxy server may not be performed, WebSocket and TCP unique communication can be utilized. In other words, the first communication method may be WebSocket or TCP unique communication.

The WebSocket is a communication method for two-way communication on the TCP between a Web server and a browser. In the WebSocket, if a TCP session is once established, then, two-way communication between the terminal and the push server can be performed. However, according to the WebSocket, communication via a proxy server which does not support the WebSocket cannot be performed. The TCP unique communication is a communication method on the TCP, which is uniquely developed by a user or the like.

(Second Exemplary Embodiment)

Hereinafter, a second exemplary embodiment of the present invention is described with reference to the drawings.

The configuration of a terminal 100 according to the second exemplary embodiment is similar to the configuration of the terminal 100 according to the first exemplary embodiment. Therefore, a description of the configuration of the terminal 100 according to the second exemplary embodiment is omitted.

In the first exemplary embodiment, the message distribution system which distributes a push message by the long polling and the direct IP has been exemplified.

However, in some cases, neither the long polling nor the direct IP cannot deliver a push message to the terminal. Such a case is, for example, that the terminal is in a no-communication state (sleep-state) for a long time, and that thus the IP address of the terminal is open.

According to the present exemplary embodiment, if neither the long polling nor the direct IP cannot deliver a push message to the terminal, the push server 200 distributes a push message, utilizing an SMS (Short Message Service).

Figure 7:
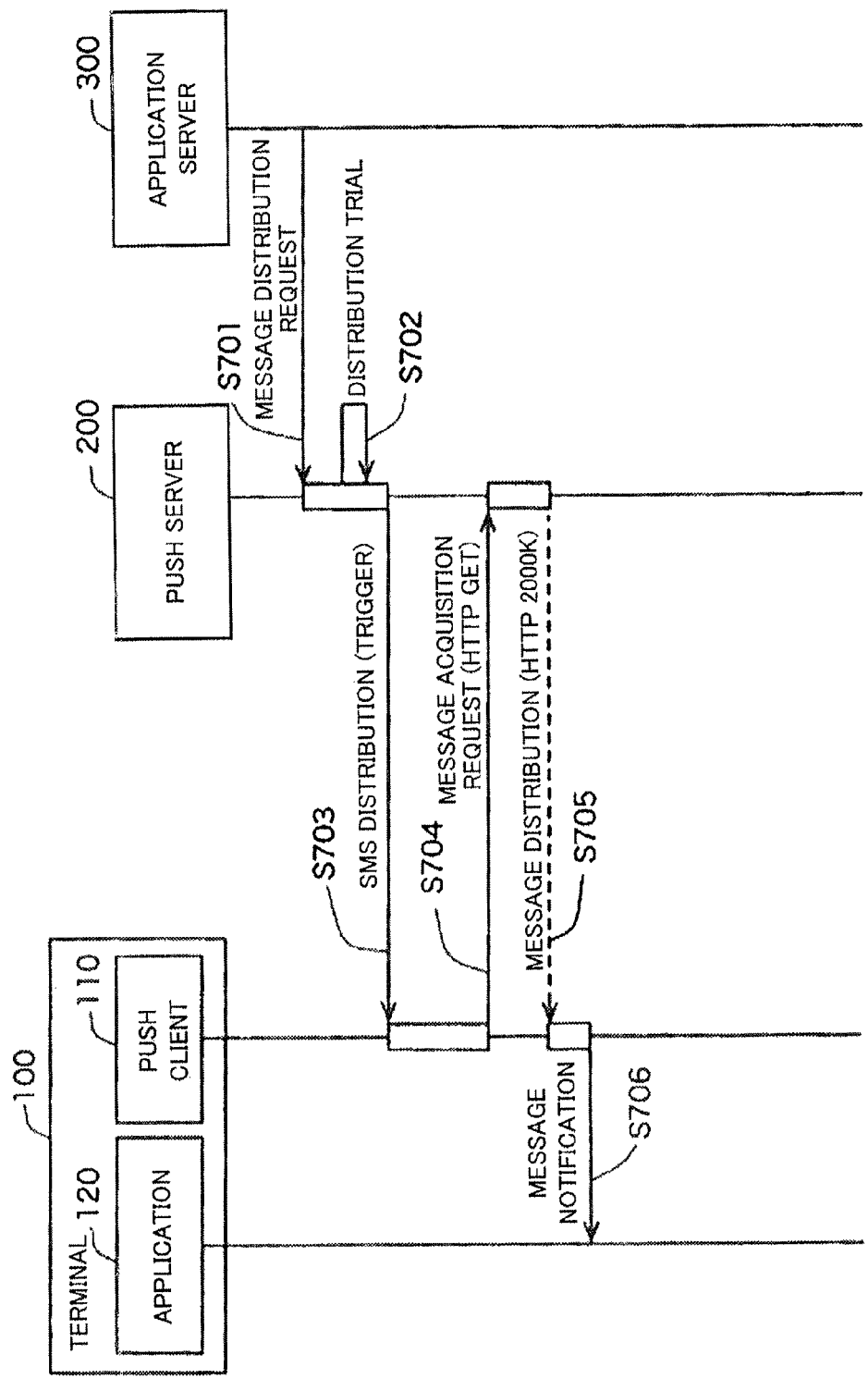
FIG. 7 is a sequence diagram illustrating a push-message distribution process according to an SMS.

FIG. 7 is a sequence diagram illustrating a push-message distribution process according to the SMS.

When receiving a push-message distribution request from the application server 300 (step S701), the push server 200 determines whether the push method selected by the terminal at a distribution destination can distribute a push message. In the present exemplary embodiment, the push server 200 performs a push-message distribution trial, and determines, based on a result of the distribution trial, whether a push message can be distributed (step S702).

If the terminal at the distribution destination selects the direct IP as the push method, the push server 200 performs a push-message distribution trial according to the direct IP. However, if the terminal at the distribution destination selects the long polling as the push method, the push server 200 performs a push-message distribution trial according to the long polling.

At that time, the terminal 100 may be in a sleep state for a long time, so that the IP address of the terminal 100 is open. In such a case, a push message cannot be distributed to the terminal 100.

If failing in the push-message distribution trial, the push server 200 determines that the push method selected by the terminal at the distribution destination cannot perform push message distribution. Then, the push server 200 transmits to the push client 110 a notification indicating that there is a push message to distribute using the SMS (step S703). At that time, even if the IP address of the terminal 100 is open, the notification transmitted by the SMS is delivered to the terminal 100. In the present exemplary embodiment, the notification transmitted by the SMS is a message update notification. In other words, when receiving the message transmitted by the SMS, the message-update-notification reception unit 113 determines that there is a message update notification.

When the message-update-notification reception unit 113 of the push client 110 receives the notification transmitted according to the SMS, the message reception unit 114 starts a message acquisition process, using this notification as a trigger. At that time, the IP address of the terminal 100 is open. However, at a timing at which the terminal 100 tries to communicate with the push server 200, an IP address is assigned to the terminal 100. For example, a DHCP (Dynamic Host Configuration Protocol) server assigns an IP address to the terminal 100. Thus, a push message can be distributed to the terminal 100.

After the IP address is assigned to the terminal 100, the message reception unit 114 transmits a message acquisition request to the push server 200 as an HTTP request (step S704).

The push server 200 transmits a push message to the push client 110 together with an HTTP response indicating that the HTTP request is normally processed (step S705).

The message notification unit 115 of the push client 110 passes the message received in the step S705 to an application provided in a distribution destination (step S706).

As described above, in the present exemplary embodiment, when the terminal receives from the push server a notification which indicates that there is a push message to distribute, and which is transmitted using the SMS, the terminal transmits a message acquisition request to the push server. Therefore, even in the case where the push server using the long polling and the direct IP cannot deliver a push message to the terminal, if the push server transmits to the terminal a notification by the SMS, the terminal can acquire the push message based on the notification. Thus, for example, even in a case where the IP address of the terminal is open, a push message can reliably be distributed to the terminal.

Incidentally, in the present exemplary embodiment, the case of using a notification transmitted by the SMS as a trigger has been exemplified. However, if the terminal, whose IP address is open, can be notified of information indicating that there is a push message to distribute, methods other than the SMS may be utilized.

(Third Exemplary Embodiment)

Hereinafter, a third exemplary embodiment of the present invention is described with reference to the drawings.

The configuration of a terminal 100 according to the third exemplary embodiment is similar to the configuration of the terminal 100 according to each of the first exemplary embodiment and the second exemplary embodiment. Therefore, a description of the configuration of the terminal 100 according to the third exemplary embodiment is omitted.

Incidentally, in the present exemplary embodiment, if the IP address of the terminal is the same as an IP address thereof at the time of performing the last terminal status notification, the terminal-status-notification transmission unit 111 does not perform terminal status notification.

Figure 8:
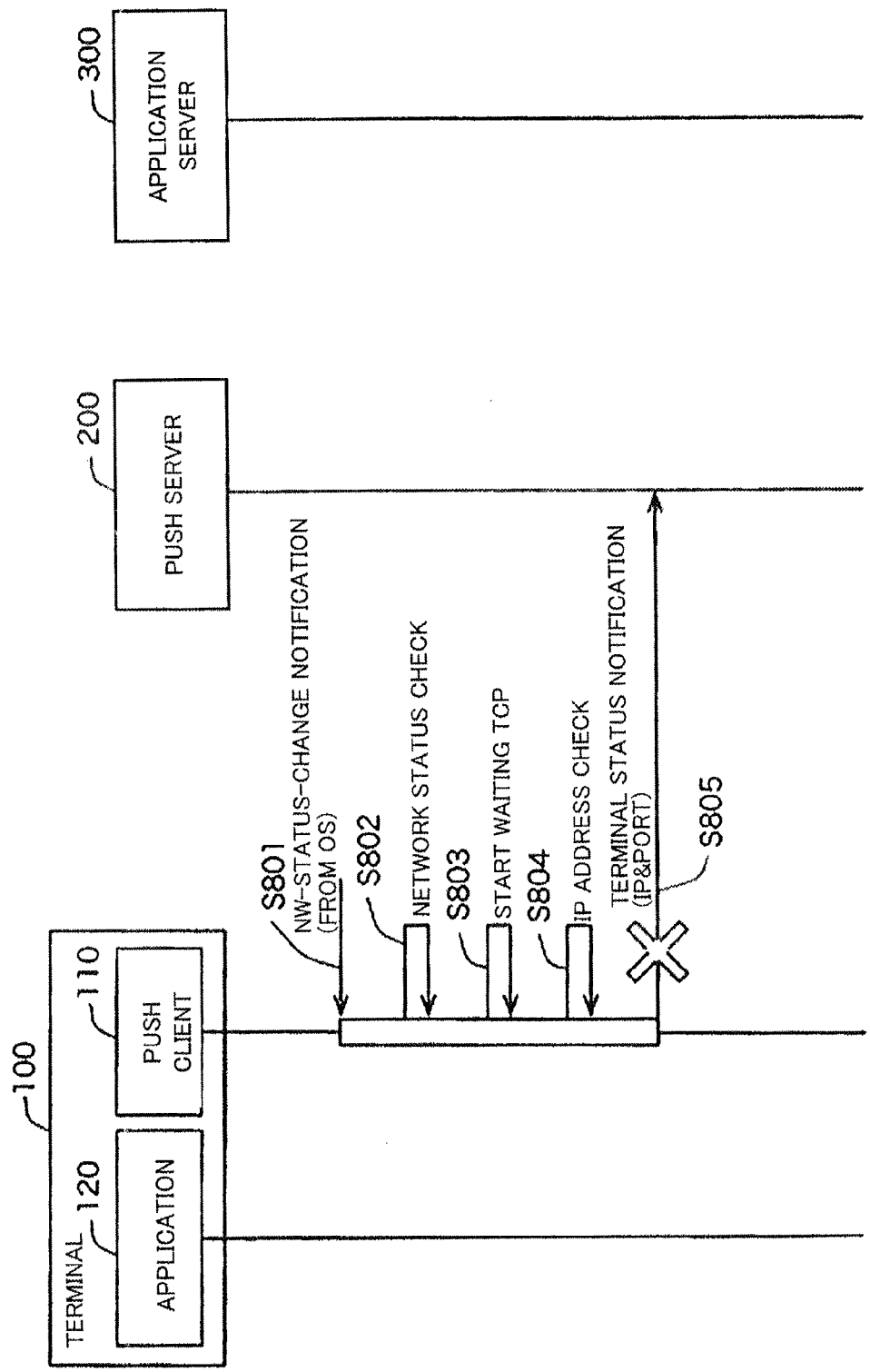
FIG. 8 is a sequence diagram illustrating an operation of a third exemplary embodiment when a terminal selects the direct IP method as a push method.

FIG. 8 is a sequence diagram illustrating an operation of the third exemplary embodiment when the terminal 100 selects the direct IP method as the push method.

Processing in step S801, that in step S802 and that in step S803 are similar to that in the step S401, that in the step S402 and that in the step S403, respectively. Therefore, a description of the processing in each of the steps S801 to S803 is omitted.

After the step S803, the terminal-status-notification transmission unit 111 checks whether an IP address currently assigned to the terminal is the same as the IP address of the terminal at the time of performing the last terminal status notification (step S804).

If the IP addresses are the same as each other, the terminal-status-notification transmission unit 111 does not perform terminal status notification (step S805). If the IP addresses are not the same as each other, the terminal-status-notification transmission unit 111 performs terminal status notification similarly to the processing in the step S404.

As described above, in the present exemplary embodiment, in the case where the terminal selects the direct IP as the push method, if the IP address of the terminal is the same as the IP address thereof at the time of performing the last terminal status notification, the terminal does not perform terminal status notification. Consequently, the processing load of each of the terminal and the push server can be alleviated. Especially, in an environment in which the network status of the terminal is frequently changed, the processing load of each of the terminal and the push server can be alleviated.

For example, in an environment in which switching between a mobile network and a WiFi is frequently performed, terminal status information is transmitted from the terminal to the push server every time where the network is switched from the WiFi to the mobile network. Accordingly, the processing load of each of the terminal and the push server may increase. However, according to the present exemplary embodiment, even in such an environment, the processing load of each of the terminal and the push server can be alleviated.

Figure 9:
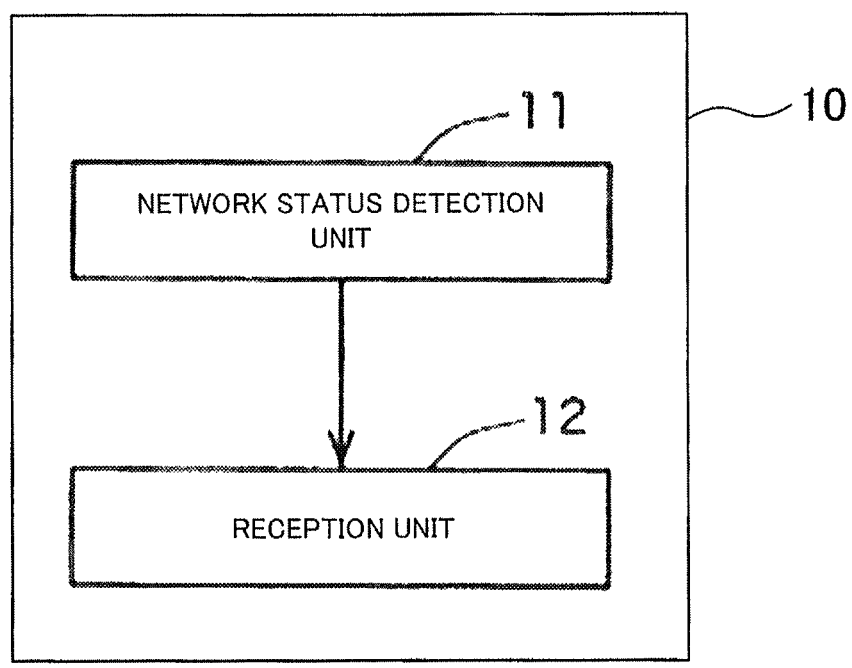
FIG. 9 is a block diagram illustrating a minimum configuration of a terminal according to the present invention.
Figure 10:
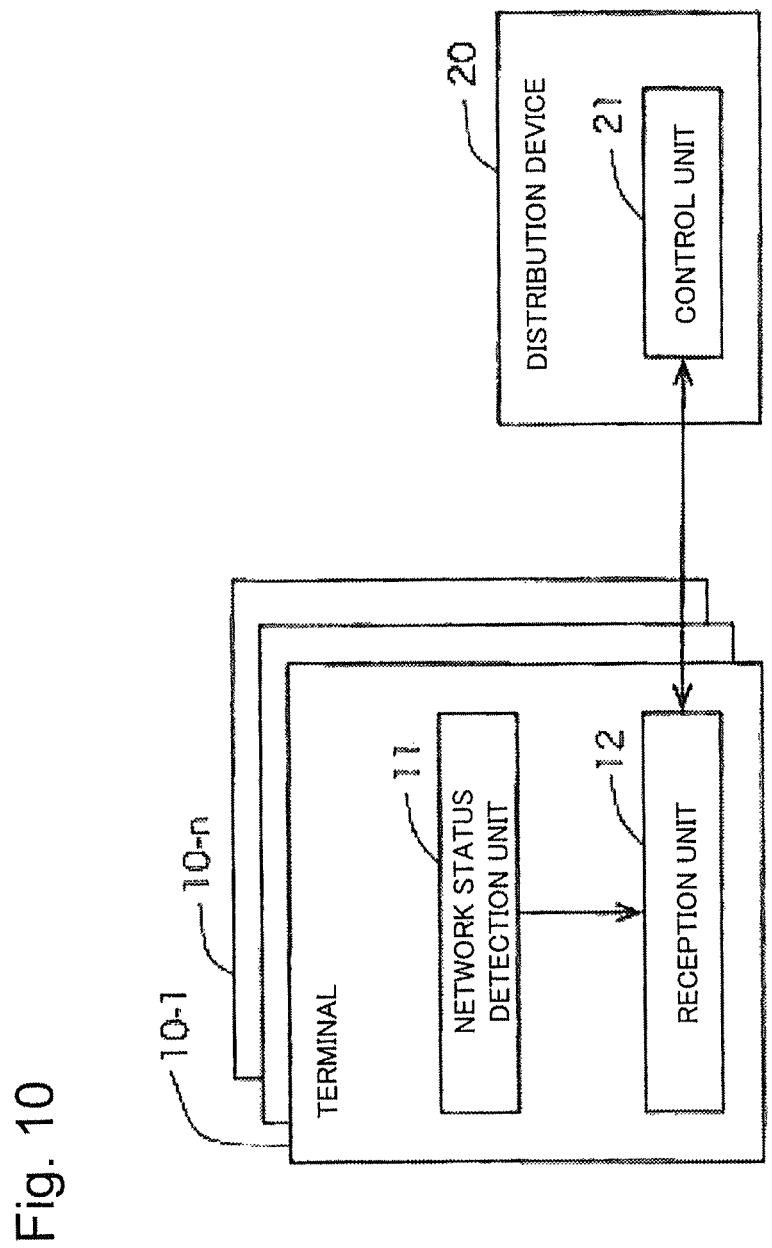
FIG. 10 is a block diagram illustrating a minimum configuration of a message distribution system according to the present invention.
Figure 11:
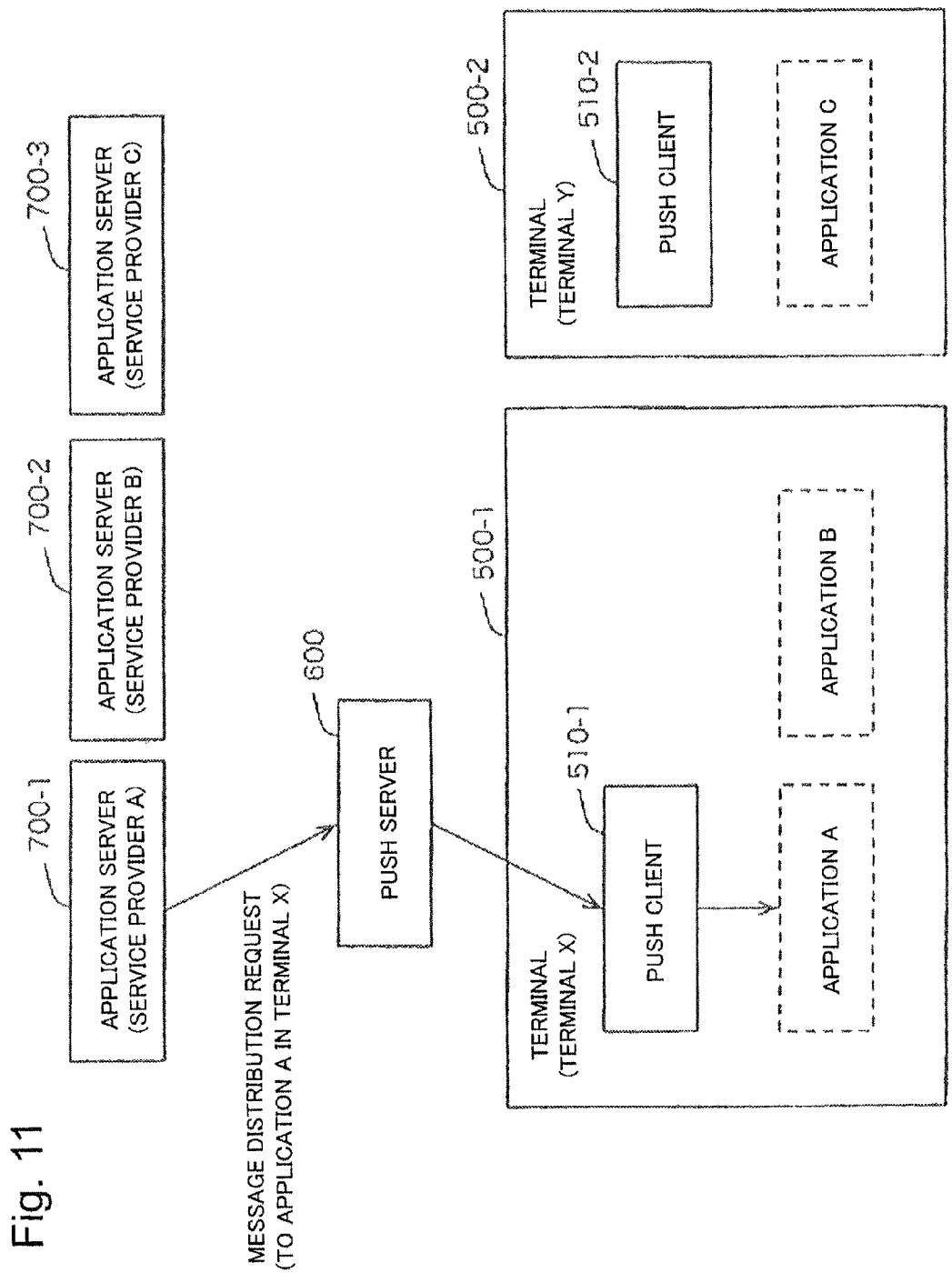
FIG. 11 is an explanatory diagram illustrating an outline of an event notification service.

FIG. 9 is a block diagram illustrating a minimum configuration of the terminal according to the present invention. FIG. 10 is a block diagram illustrating a minimum configuration of the message distribution system according to the present invention.

As illustrated in FIG. 9, the terminal 10 (equivalent to each of the terminals 100-1 to 100-n and the terminal illustrated in FIG. 2) includes:

a network status detection unit 11 which detects a status of a network connecting the terminal and a distribution device (equivalent to the push server 200 illustrated in FIG. 1) performing push-type message distribution; and a reception unit 12 which determines, based on a result of the detection, whether the terminal and the distribution device are located in a same IP address space, selects, if the terminal and the distribution device are not located in the same IP address space, a first communication method utilizing a pre-established TCP session, selects, if the terminal and the distribution device are located in the same IP address space, a second communication method utilizing a TCP session between the distribution device and the terminal, which is newly established by the distribution device when a message is distributed, and receives a message from the distribution device according to the selected communication method.

Incidentally, the network status detection unit 11 is equivalent to the NW status detection unit 112 of the push client 110 of the terminal 100 illustrated in FIG. 2. The reception unit 12 is equivalent to a set of the terminal-status-notification transmission unit 111, the message-update-notification reception unit 113, and the message reception unit 114 of the push client 110 of the terminal 100 illustrated in FIG. 2.

With such a configuration, a push message can reliably be delivered to the terminal, regardless of the type of network, while reducing the processing load of the distribution device.

Figure 12:
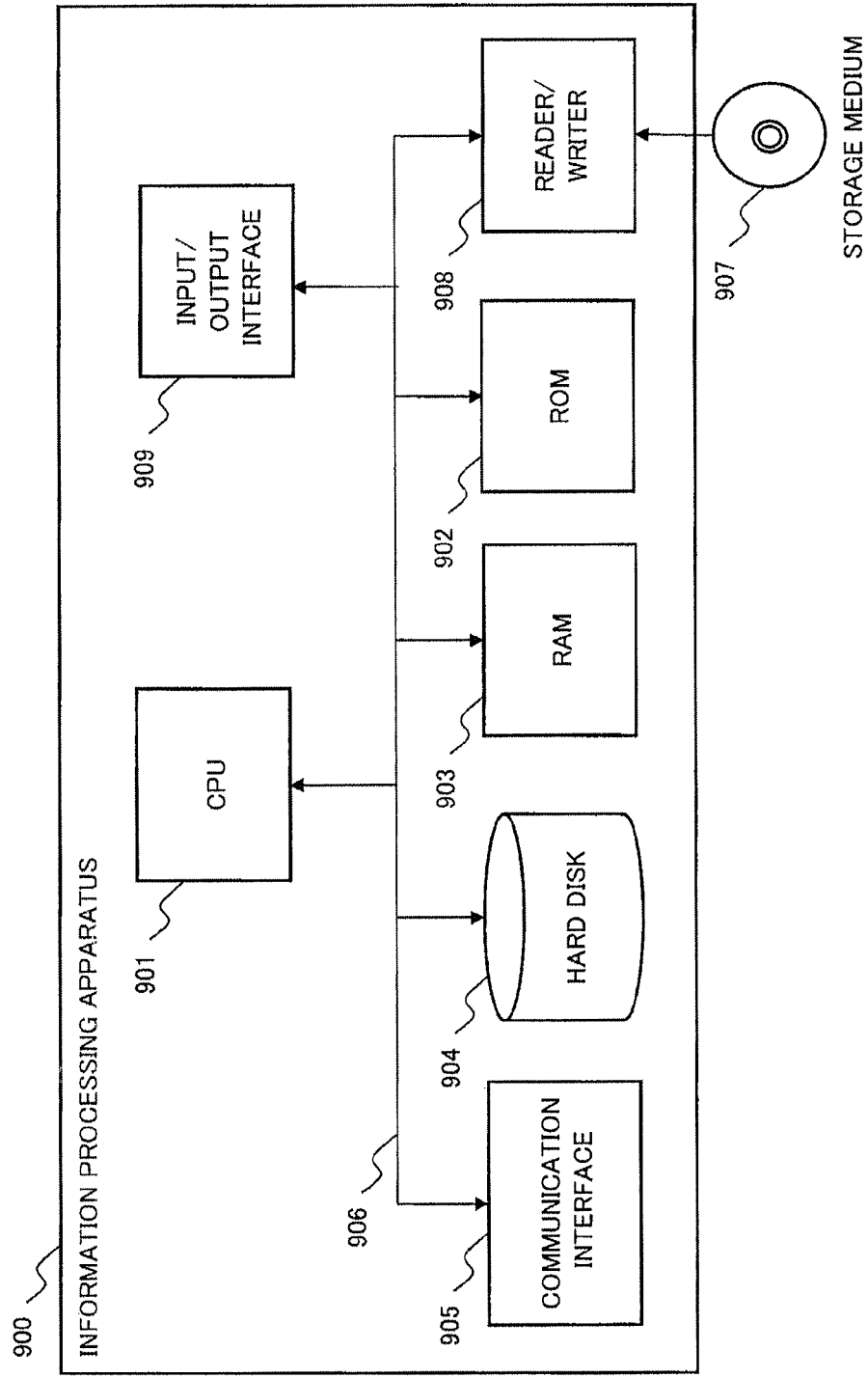
FIG. 12 illustrates an exemplary configuration of a computer.

FIG. 12 illustrates, by way of example, a configuration of an information processing apparatus 900 (computer) which can implement a terminal or server relevant to an exemplary embodiment of the present invention. In other words, FIG. 12 illustrates a configuration of a computer (information processing apparatus) capable of implementing the terminal or server illustrated in FIGS. 1,2,9-11, representing a hardware environment where the individual functions in the above-described exemplary embodiments can be implemented.

The information processing apparatus 900 illustrated in FIG. 12 includes the following as components:
CPU 901 (Central_Processing_Unit);
ROM 902 (Read_Only_Memory);
RAM 903 (Random_Access_Memory);
Hard disk 904 (storage device);
Communication interface to an external device 905 (Interface: hereinafter called "I/F");
Reader/writer 908 capable of reading and writing data stored in a storage medium 907 such as CD-ROM (Compact_Disc_Read_Only_Memory); and
Input/output interface 909.

The information processing apparatus 900 is a general computer where these components are connected via a bus 906 (communication line).

The present invention explained with the above-described exemplary embodiments as examples is accomplished by providing the information processing apparatus 900 illustrated in FIG. 12 with a computer program which is capable of implementing the functions illustrated in the block diagrams (FIGS. 1,2,9-10) or the flowcharts (FIGS. 3-8) referenced in the explanation of these embodiments, and then by reading the computer program into the CPU 901 in such hardware, interpreting it, and executing it. The computer program provided to the apparatus can be stored in a volatile readable and writable storage memory (RAM 903) or in a nonvolatile storage device such as the hard disk 904.

In addition, in the case described above, general procedures can now be used to provide the computer program to such hardware. These procedures include, for example, installing the computer program into the apparatus via any of various storage media 907 such as CD-ROM, or downloading it from an external source via communication lines such as the Internet. In these cases, the present invention can be seen as being composed of codes forming such computer program or being composed of the storage medium 907 storing the codes.

In the above exemplary embodiments, the following terminals are also disclosed.

(1) A terminal in which a reception unit 12 determines, if a network connecting the terminal and a distribution device is a wireless LAN, that the terminal and the distribution device are not located in a same IP address space, and also determines, if the network is a mobile network, that the terminal and the distribution device are located in the same IP address space.

With such a configuration, it can be determined, based on the type of the network, whether the terminal and the distribution device are located in the same IP address space.

(2) A terminal in which, if a first communication method is selected, a reception unit 12 transmits to a distribution device a query request querying presence/absence of a message to distribute, and in which, if a second communication method is selected, the reception unit 12 transmits to the distribution device a message acquisition request when a TCP connection with the distribution device is detected.

With such a configuration, a push message can be acquired from the distribution device according to the selected push method.

(3) A terminal in which a reception unit 12 notifies, when a second communication method is selected, a distribution device of terminal status information including an IP address of the terminal.

With such a configuration, the distribution device can recognize the IP address of the terminal, and the like, based on a terminal status notification. Thus, a TCP connection from the distribution device to the terminal can be performed. In addition, the notification of the terminal status information enables the distribution device to recognize that the terminal selects the direct IP as the push method.

(4) A terminal in which a reception unit 12 transmits a message acquisition request to a distribution device when detecting a notification which indicates that there is a push message to distribute and which is transmitted by an SMS.

With such a configuration, for example, even when the IP address of the terminal is open, the notification by the SMS enables the terminal to recognize that there is a push message to distribute. Accordingly, even in such a case, the terminal can reliably acquire a push message.

(5) A terminal in which a reception unit 12 does not notify a distribution device of terminal status information if an IP address of the terminal at the time of notifying the last terminal status information is a same as a current IP address of the terminal.

With such a configuration, for example, in an environment in which switching between a mobile network and a WiFi is frequently performed, terminal status information can be suppressed from being transmitted when a network is switched to the mobile network. Accordingly, the processing load of each of the terminal and the push server can be more alleviated.

In the above exemplary embodiments, a message distribution system illustrated in FIG. 10 is also disclosed.

(6) A message distribution system including terminals 10-1 to 10-n (equivalent to the terminals 100-1 to 100-n illustrated in FIG. 1) and a distribution device 20 (equivalent to the push server 200 illustrated in FIG. 1) which performs push-type message distribution to the terminals 10-1 to 10-n, each of the terminals 10-1 to 10-n including:
a network status detection unit 11 which detects a status of a network connecting the terminal and the distribution device 20; and
a reception unit 12 which determines, based on a result of the detection, whether the terminal and the distribution device 20 are located in a same IP address space, selects, if the terminal and the distribution device 20 are not located in the same IP address space, a first communication method utilizing a pre-established TCP session, selects, if the terminal and the distribution device 20 are located in the same IP address space, a second communication method utilizing a TCP session between the distribution device 20 and the terminal, which is newly established by the distribution device 20 when a message is distributed, and receives a message from the distribution device 20 according to the selected communication method, the distribution device 20 including a control unit 21 (equivalent to the control unit (not illustrated) of the push server 200 illustrated in FIG. 1) which performs message distribution according to a communication-method selection result notified from the terminal.

With such a configuration, a push message can reliably be delivered to the terminal, regardless of the type of network utilized by the terminal, without increasing the processing load of a distribution device.

(7) A message distribution system in which, if a network connecting a terminal and a distribution device 20 is a wireless LAN, a reception unit 12 determines that the terminal and the distribution device 20 are not located in a same IP address space, and in which, if the network is a mobile network, the reception unit 12 determines that the terminal and the distribution device 20 are located in the same IP address space.

With such a configuration, based on the type of the network, it can be determined whether the terminal and the distribution device are in the same IP address space.

Further, a part or all of the above exemplary embodiments may be described as the following supplemental notes. However, the present invention is not limited to the following supplemental notes.

(Supplemental Note 1) A message distribution system including terminals 10-1 to 10-n, and a distribution device 20 which performs push-type message distribution, each of the terminals 10-1 to 10-n including a network status detection unit 11 which detects a status of a network connecting the terminal and the distribution device 20, and a reception unit 12 which determines, based on a result of the detection, whether the terminal and the distribution device 20 are located in a same IP address space, selects, if the terminal and the distribution device 20 are not located in the same IP address space, a first communication method utilizing a pre-established TCP session, selects, if the terminal and the distribution device 20 are located in the same IP address space, a second communication method utilizing a TCP session between the distribution device 20 and the terminal, which is newly established by the distribution device 20 when a message is distributed, and receives a message from the distribution device 20 according to the selected communication method, the distribution device 20 including a control unit 21 which performs message distribution according to a communication-method selection result notified from the terminal.

(Supplemental Note 2) A message distribution system according to the supplemental note 1, in which the reception unit 12 determines, if the network connecting the terminal and the distribution device 20 is a wireless LAN, that the terminal and the distribution device 20 is not located in the same IP address space, and also determines, if the network connecting the terminal and the distribution device 20 is a mobile network, that the terminal and the distribution device 20 is located in the same IP address space.

(Supplemental Note 3) A message distribution system according to the supplemental note 1 or the supplemental note 2, in which, if the first communication method is selected, the reception unit 12 transmits to the distribution device 20 a query request querying presence/absence of a message to distribute, and in which, if the second communication method is selected, the reception unit 12 transmits to the distribution device 20 a message acquisition request when a TCP connection with the distribution device 20 is detected.

With such a configuration, according to the push method selected by the terminal, a push message can be distributed from the distribution device to the terminal.

(Supplemental Note 4) A message distribution system according to one of the supplemental note 1 to the supplemental note 3, in which the reception unit 12 notifies, when the second communication method is selected, the distribution device 20 of terminal status information including the IP address of the terminal, and in which, when a message is distributed, the control unit 21 establishes a TCP session with the terminal 10-1, . . . , or 10-n, based on the terminal status information.

With such a configuration, the distribution device can recognize the IP address of the terminal, and the like, based on the terminal status notification. Thus, a TCP connection with the terminal from the distribution device can be performed. Further, the notification of the terminal status information enables the distribution device to recognize that the terminal selects the direct IP as the push method.

(Supplemental Note 5) A message distribution system according to one of the supplemental note 1 to the supplemental note 4, in which when determining that message distribution by the first communication method or the second communication method cannot be performed, the control unit 21 transmits to the terminal 10-1, . . . or 10-n a notification which indicates that there is a message to distribute and is transmitted by an SMS, and in which when detecting a notification transmitted by the SMS, the reception unit 12 transmits a message acquisition request to the distribution device 20.

With such a configuration, for example, even when the IP address of the terminal is open, the distribution device transmits a notification by the SMS, so that the distribution device can make the terminal recognize that there is a push message to distribute. Accordingly, the distribution device can reliably transmit a push message to the terminal.

(Supplemental Note 6) A message distribution system according to the supplemental note 4 or the supplemental note 5, in which, if the IP address of the terminal at the time of notifying the last terminal status information is a same as a current IP address of the terminal, the reception unit 12 does not notify the distribution device 20 of terminal status information.

With such a configuration, for example, in an environment in which switching between the mobile network and the WiFi, terminal status information can be suppressed from being transmitted when the network is switched to the mobile network. Consequently, the processing load of each of the terminal and the push server can be more alleviated.

This application claims priority from Japanese Patent Application No. 2012-230001 filed Oct. 17, 2012, the disclosure of which is hereby incorporated by reference herein in its entirety.

Thus, the present invention has been described with reference to the exemplary embodiments. However, the present invention is not limited to the above exemplary embodiments. Various modifications that can be understood by those skilled in the art can be made to the configuration and details of the present invention within the scope of the invention.

REFERENCE SIGNS LIST

10-1 to 10-n, 100, 100-1 to 100-n, 500-1, 500-2 Terminals
11, 112 Network (NW) status detection units
12 Reception unit
20 Distribution device 21 Control unit
110, 510-1, 510-2 Push clients
111 Terminal-status-notification transmission unit
113 Message-update-notification reception unit
114 Message reception unit
115 Message notification unit
120-1 to 120-n Applications
200, 600 Push servers
300, 300-1 to 300-n, 700-1 to 700-3 Application servers

The invention claimed is:

1. A terminal comprising:
a memory storing instructions; and
a processor that, when executing the instructions, is configured to:
  detect a type of a network connecting the terminal to a push server, wherein the push server performs push-type message distribution;
  determine, based on a result of the detection, whether the terminal and the push server are located in a same IP address spaced;
  select, if the terminal and the push server are not located in the same IP address space, a first communication method utilizing a pre-established TCP session;
  select, if the terminal and the push server are located in the same IP address space, a second communication method establishing a TCP session between the terminal and the push server by the push server when a message is distributed; and
  receive a message from the push server according to the selected communication method.

2. The terminal according to claim 1, wherein the processor is further configured to:
  determine, if the network connecting the terminal to the push server is a wireless LAN, that the terminal and the push server are not located in the same IP address space; and
  determine, if the network connecting the terminal to the push server is a mobile network, that the terminal and the push server are located in the same IP address space.

3. The terminal according to claim 1, wherein the processor is further configured to:
  if the first communication method is selected, transmit to the push server a query request querying presence/absence of a message to distribute; and
  if the second communication method is selected, transmit to the push server a message acquisition request when a TCP connection with the push server is detected.

4. The terminal according to claim 1, wherein the processor is further configured to notify, when the second communication method is selected, the push server of terminal status information including an IP address of the terminal.

5. The terminal according to claim 1, wherein the processor is further configured to transmit, when detecting that a notification transmitted by SMS indicates that there is a message to distribute, a message acquisition request to the push server.

6. The terminal according to claim 4, wherein, if a current IP address of the terminal is identical to an IP address of the terminal at a last notification of terminal status information, the processor does not notify the push server of terminal status information.

7. A message distribution system comprising:
a terminal; and
a push server which performs push-type message distribution to the terminal,
wherein the terminal comprises a processor configured to:
  detect a type of a network connecting the terminal to the push server;
  determine, based on a result of the detection, whether the terminal and the push server are located in a same IP address spaced;
  select, if the terminal and the push server are not located in the same IP address space, a first communication method utilizing a pre-established TCP session;
  select, if the terminal and the push server are located in the same IP address space, a second communication method establishing a TCP session between the terminal and the push server by the push server when a message is distributed; and
  receive a message from the push server according to the selected communication method,
wherein the push server is further configured to perform message distribution according to a communication-method selection result notified from the terminal.

8. The message distribution system according to claim 7, wherein the processor is further configured to:
  determine, if the network connecting the terminal to the push server is a wireless LAN, that the terminal and the push server are not located in the same IP address space; and
  determine, if the network connecting the terminal to the push server is a mobile network, that the terminal and the push server are located in the same IP address space.

9. A message distribution method comprising:
  detecting by a terminal a type of a network connecting the terminal to a push server which performs message distribution;
  determining, based on a result of the detection, whether the terminal and the push server are located in a same IP address space;
  selecting, if the terminal and the push server are not located in the same IP address space, a first communication method utilizing a pre-established TCP session;
  selecting, if the terminal and the push server are located in the same IP address space, a second communication method establishing a TCP session between the terminal and the push server by the push server when a message is distributed; and
  performing message distribution by the push server according to a communication-method selection result notified from the terminal.

10. The message distribution method according to claim 9, wherein,
  if the network connecting the terminal to the push server is a wireless LAN, it is determined that the terminal and the push server are not located in a same IP address space; and
  if the network connecting the terminal to the push server is a mobile network, it is determined that the terminal and the push server are located in the same IP address space.

11. A non-transitory computer-readable medium that stores therein a message reception program for causing a computer, which is mounted in a terminal, to be capable of communicating with a push server that executes push-type message distribution processes, the program causing the computer to:
- detect a type of a network connecting the terminal to the push server;
- determine, based on a result of the detection, whether the terminal and the push server are located in a same IP address space;
- select, if the terminal and the push server are not located in the same IP address space, a first communication method utilizing a pre-established TCP session; and
- select, if the terminal and the push server are located in the same IP address space, a second communication method establishing a TCP session between the terminal and the push server by the push server when a message is distributed; and
- receive a message from the push server according to the selected communication method.

12. A medium according to claim 11, wherein the program causes the computer to:
- determine, if the network connecting the terminal to the push server is a wireless LAN, that the terminal and the push server are not located in a same IP address space; and
- determine, if the network connecting the terminal to the push server is a mobile network, that the terminal and the push server are located in the same IP address space.

* * * * *